(No Model.)

F. C. BROOKS.
HYDRAULIC JACK.

No. 605,630. Patented June 14, 1898.

Witnesses
J. M. Gridley
Chas. I. Welch

Inventor
Frank C. Brooks
By his Attorney
Paul A. Staley

UNITED STATES PATENT OFFICE.

FRANK C. BROOKS, OF DAYTON, OHIO, ASSIGNOR OF ONE-HALF TO THE JOYCE-CRIDLAND COMPANY, OF SAME PLACE.

HYDRAULIC JACK.

SPECIFICATION forming part of Letters Patent No. 605,630, dated June 14, 1898.

Application filed February 10, 1896. Serial No. 578,661. (No model.)

*To all whom it may concern:*

Be it known that I, FRANK C. BROOKS, a citizen of the United States, residing at Dayton, in the county of Montgomery and State of Ohio, have invented certain new and useful Improvements in Hydraulic Jacks, of which the following is a specification.

This invention relates to improvements in hydraulic jacks; and it especially relates to improvements in packings for the bottom of hydraulic-jack cylinders.

The invention consists in the constructions and combinations of parts hereinafter described, and set forth in the claim.

Figure 1:
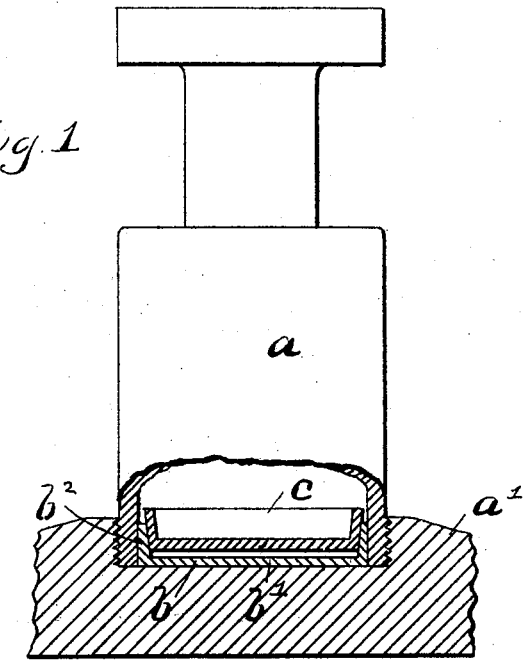
Figure 2:
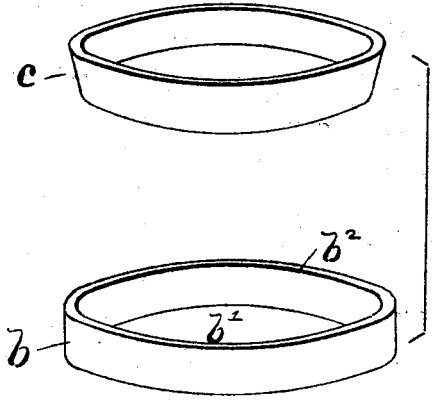

In the accompanying drawings, Figure 1 is a side elevation of an ordinary hydraulic jack, a portion being broken away and shown in section to illustrate my improved packing device. Fig. 2 is a perspective view of the packing device in detail.

Like parts are represented by similar letters of reference in both views.

In the drawings, $a$ represents the cylinder of a hydraulic jack, and $a'$ the base, the cylinder being screw-threaded at the lower end and screwed into the base, which is cupped out to receive it. The base is preferably made of cast-iron, and under the heavy hydrostatic pressure which occurs in the cylinder the liquid contained in the cylinder will, if not effectually stopped, be forced through the pores of the iron, as well as the joint between the cylinder and the base. To prevent this leakage and to effectually seal the bottom of the cylinder, I employ a cup-shaped packing $b$, preferably of soft copper or annealed brass. This cup-shaped packing is formed with a bottom web $b'$ and an upwardly-projecting annular flange or ring $b^2$. The outer periphery of the outer ring or flange $b^2$ is turned cylindrical of a size to fit snugly within the cylinder $a$, the outer periphery when placed in the cylinder being adapted to stand parallel with the periphery of the cylinder. The inside of this annular flange $b^2$ is turned tapering—that is, the sides inclined outwardly from the bottom toward the top. Within the cup-shaped packing thus formed there is fitted a plug $c$, preferably of cast-iron or of other metal harder than the copper. This plug is formed with an inclined or cone-shaped outer periphery, which fits the inclined sides of the inner periphery of the flange $b^2$. The plug $c$ is also preferably formed cup-shaped; but this is immaterial. The bottom web $b'$ of the cup-shaped packing is made to fit over and against the base $a'$ and entirely close the bottom of the cylinder.

The parts thus described are placed in their positions and fit snugly therein. As the pressure is increased in the cylinder the plug is forced downwardly into the soft-copper cup-shaped packing, and thus presses the sides laterally and evenly against the inner periphery of the cylinder and base, thus forming a tight joint at the bottom of the said cylinder, effectually sealing the same against any escape of the liquids either through the pores of the base or through the joint between the cylinder and the base.

In use the cylinder is subjected to heavy internal pressure, and by the construction of the parts and their relation to each other this pressure is continued to the end of the cylinder, thereby giving it a more solid or firm support at and in the base, and by making the plug continuous, or without any central opening or hole, it receives the full amount of pressure and also prevents water from getting under it, so as to neutralize its pressure on the cup-rim.

Having thus described my invention, I claim—

The combination with the cylinder of a hydraulic jack having a removable base, of a continuous metallic cup packing covering the base within the cylinder, and fitting against the inner surface of the cylinder by a rim or flange having its interior inclined, and a continuous expanding plug of harder metal having a reversely-inclined periphery adapted to partially descend under hydraulic pressure to expand the cup-rim against the cylinder and to force the packed end of the cylinder laterally against its base-support, whereby leakage in any direction is prevented and the cylinder more firmly held in its seat, substantially as specified.

In testimony whereof I have hereunto set my hand this 3d day of February, A. D. 1896.

FRANK C. BROOKS.

Witnesses:
JOHN SINGER,
JOHN L. H. FRANK.